(12) United States Patent
Huang

(10) Patent No.: US 11,803,748 B2
(45) Date of Patent: Oct. 31, 2023

(54) GLOBAL ADDRESS PARSER

(71) Applicant: SAP SE, Walldorf (DE)

(72) Inventor: Xinrong Huang, Shanghai (CN)

(73) Assignee: SAP SE, Walldorf (DE)

( * ) Notice: Subject to any disclaimer, the term of this patent is extended or adjusted under 35 U.S.C. 154(b) by 216 days.

(21) Appl. No.: 16/888,029

(22) Filed: May 29, 2020

(65) Prior Publication Data

US 2021/0374522 A1   Dec. 2, 2021

(51) Int. Cl.
*G06F 16/23* (2019.01)
*G06N 3/08* (2023.01)
*G06F 40/205* (2020.01)

(52) U.S. Cl.
CPC .......... *G06N 3/08* (2013.01); *G06F 16/2379* (2019.01); *G06F 40/205* (2020.01)

(58) Field of Classification Search
CPC ...... G06N 3/08; G06F 16/2379; G06F 40/205
See application file for complete search history.

(56) References Cited

U.S. PATENT DOCUMENTS

| 10,839,156 | B1 * | 11/2020 | Saxena | ..................... | G06F 40/30 |
| 2009/0271029 | A1 * | 10/2009 | Doutre | ................. | G06V 30/416 |
| | | | | | 700/224 |
| 2017/0220655 | A1 * | 8/2017 | Henrichs | ............... | G06F 16/283 |
| 2020/0058042 | A1 * | 2/2020 | Kulkarni | ................. | G06N 20/00 |

FOREIGN PATENT DOCUMENTS

| CN | 108052609 A | * | 5/2018 | ............. | G06F 17/30 |
| CN | 110688449 A | * | 1/2020 | ............... | G06N 3/04 |

OTHER PUBLICATIONS

Amber Wilcox-O'Hearn ("Detection is the central problem in real-word spelling correction"; Department of Computer Science; University of Toronto; Aug. 13, 2014) (Year: 2014).*

* cited by examiner

*Primary Examiner* — Ken Hoang
(74) *Attorney, Agent, or Firm* — Fountainhead Law Group P.C.

(57) ABSTRACT

The present disclosure pertains to parsing addresses using a deep learning model. The deep learning model may be trained using a plurality of reference address records and a plurality of modifications to the plurality of reference address records. In some implementations, the model can be a multi-layer bi-directional long short-term memory recurrent neural network model. The output of the model may include indications of an address component type for each character of the address. The output can be parsed based on the indications of the address component type to obtain a plurality of labeled address components for the address. The labeled address components can be compared to reference address records to determine a matched address record identifying a geographic location.

20 Claims, 7 Drawing Sheets

| | SEPARATOR | UNIT_NUMBER | UNIT_DESCRIPTION | FLOOR_NUMBER | FLOOR_DESCRIPTION | BUILDING_NAME | PRIMARY_NUMBER | PRIMARY_NAME | PRIMARY_TYPE | PRIMARY_PREFIX | PRIMARY_POSTFIX | LOCALITY | REGION | POSTCODE | COUNTRY |
|---|---|---|---|---|---|---|---|---|---|---|---|---|---|---|---|
| 1 | F | F | F | F | F | F | T | F | F | F | F | F | F | F | F |
| 0 | F | F | F | F | F | F | T | F | F | F | F | F | F | F | F |
| 0 | F | F | F | F | F | F | T | F | F | F | F | F | F | F | F |
|   | T | F | F | F | F | F | F | F | F | F | F | F | F | F | F |
| M | F | F | F | F | F | F | F | T | F | F | F | F | F | F | F |
| A | F | F | F | F | F | F | F | T | F | F | F | F | F | F | F |
| I | F | F | F | F | F | F | F | T | F | F | F | F | F | F | F |
| N | F | F | F | F | F | F | F | T | F | F | F | F | F | F | F |
|   | T | F | F | F | F | F | F | F | F | F | F | F | F | F | F |
| S | F | F | F | F | F | F | F | F | T | F | F | F | F | F | F |
| T | F | F | F | F | F | F | F | F | T | F | F | F | F | F | F |
| , | T | F | F | F | F | F | F | F | F | F | F | F | F | F | F |
| S | F | F | F | F | F | F | F | F | F | F | F | T | F | F | F |
| E | F | F | F | F | F | F | F | F | F | F | F | T | F | F | F |
| A | F | F | F | F | F | F | F | F | F | F | F | T | F | F | F |
| T | F | F | F | F | F | F | F | F | F | F | F | T | F | F | F |
| T | F | F | F | F | F | F | F | F | F | F | F | T | F | F | F |
| L | F | F | F | F | F | F | F | F | F | F | F | T | F | F | F |
| E | F | F | F | F | F | F | F | F | F | F | F | T | F | F | F |
| , | T | F | F | F | F | F | F | F | F | F | F | F | F | F | F |
| W | F | F | F | F | F | F | F | F | F | F | F | F | T | F | F |
| A | F | F | F | F | F | F | F | F | F | F | F | F | T | F | F |
| , | T | F | F | F | F | F | F | F | F | F | F | F | F | F | F |
| 9 | F | F | F | F | F | F | F | F | F | F | F | F | F | T | F |
| 8 | F | F | F | F | F | F | F | F | F | F | F | F | F | T | F |
| 1 | F | F | F | F | F | F | F | F | F | F | F | F | F | T | F |
| 0 | F | F | F | F | F | F | F | F | F | F | F | F | F | T | F |
| 4 | F | F | F | F | F | F | F | F | F | F | F | F | F | T | F |
| , | T | F | F | F | F | F | F | F | F | F | F | F | F | F | F |
| U | F | F | F | F | F | F | F | F | F | F | F | F | F | F | T |
| S | F | F | F | F | F | F | F | F | F | F | F | F | F | F | T |

| | SEPARATOR | UNIT_NUMBER | UNIT_DESCRIPTION | 0LOOR_NUMBER | 0LOOR_DESCRIPTION | BUILDING_NAME | PRIMARY_NUMBER | PRIMARY_NAME | PRIMARY_TYPE | PRIMARY_PREOIX | PRIMARY_POSTOIX | LOCALITY | REGION | POSTCODE | COUNTRY |
|---|---|---|---|---|---|---|---|---|---|---|---|---|---|---|---|
| 1 | 0.00 | 0.00 | 0.00 | 0.00 | 0.00 | 0.00 | 1.00 | 0.00 | 0.00 | 0.00 | 0.00 | 0.00 | 0.00 | 0.00 | 0.00 |
| 0 | 0.00 | 0.00 | 0.00 | 0.00 | 0.00 | 0.00 | 1.00 | 0.00 | 0.00 | 0.00 | 0.00 | 0.00 | 0.00 | 0.00 | 0.00 |
| 0 | 0.00 | 0.00 | 0.00 | 0.00 | 0.00 | 0.00 | 1.00 | 0.00 | 0.00 | 0.00 | 0.00 | 0.00 | 0.00 | 0.00 | 0.00 |
|   | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| M | 0.00 | 0.00 | 0.00 | 0.00 | 0.00 | 0.00 | 0.00 | 1.00 | 0.00 | 0.00 | 0.00 | 0.00 | 0.00 | 0.00 | 0.00 |
| A | 0.00 | 0.00 | 0.00 | 0.00 | 0.00 | 0.00 | 0.00 | 1.00 | 0.00 | 0.00 | 0.00 | 0.00 | 0.00 | 0.00 | 0.00 |
| I | 0.00 | 0.00 | 0.00 | 0.00 | 0.00 | 0.00 | 0.00 | 1.00 | 0.00 | 0.00 | 0.00 | 0.00 | 0.00 | 0.00 | 0.00 |
| N | 0.00 | 0.00 | 0.00 | 0.00 | 0.00 | 0.00 | 0.00 | 1.00 | 0.00 | 0.00 | 0.00 | 0.00 | 0.00 | 0.00 | 0.00 |
|   | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| S | 0.00 | 0.00 | 0.00 | 0.00 | 0.00 | 0.00 | 0.00 | 0.00 | 1.00 | 0.00 | 0.00 | 0.00 | 0.00 | 0.00 | 0.00 |
| T | 0.00 | 0.00 | 0.00 | 0.00 | 0.00 | 0.00 | 0.00 | 0.00 | 1.00 | 0.00 | 0.00 | 0.00 | 0.00 | 0.00 | 0.00 |
| , | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| S | 0.00 | 0.00 | 0.00 | 0.00 | 0.00 | 0.01 | 0.00 | 0.00 | 0.00 | 0.00 | 0.00 | 0.99 | 0.00 | 0.00 | 0.00 |
| E | 0.00 | 0.00 | 0.00 | 0.00 | 0.00 | 0.01 | 0.00 | 0.00 | 0.00 | 0.00 | 0.00 | 0.99 | 0.00 | 0.00 | 0.00 |
| A | 0.00 | 0.00 | 0.00 | 0.00 | 0.00 | 0.02 | 0.00 | 0.00 | 0.00 | 0.00 | 0.00 | 0.99 | 0.00 | 0.00 | 0.00 |
| T | 0.00 | 0.00 | 0.00 | 0.00 | 0.00 | 0.01 | 0.00 | 0.00 | 0.00 | 0.00 | 0.00 | 0.98 | 0.00 | 0.00 | 0.00 |
| T | 0.00 | 0.00 | 0.00 | 0.00 | 0.00 | 0.01 | 0.00 | 0.00 | 0.00 | 0.00 | 0.00 | 0.99 | 0.00 | 0.00 | 0.00 |
| L | 0.00 | 0.00 | 0.00 | 0.00 | 0.00 | 0.02 | 0.00 | 0.00 | 0.00 | 0.00 | 0.00 | 0.99 | 0.00 | 0.00 | 0.00 |
| E | 0.00 | 0.00 | 0.00 | 0.00 | 0.00 | 0.00 | 0.00 | 0.00 | 0.00 | 0.00 | 0.00 | 0.98 | 0.00 | 0.00 | 0.00 |
| , | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| W | 0.00 | 0.00 | 0.00 | 0.00 | 0.00 | 0.00 | 0.00 | 0.00 | 0.00 | 0.00 | 0.00 | 0.00 | 1.00 | 0.00 | 0.00 |
| A | 0.00 | 0.00 | 0.00 | 0.00 | 0.00 | 0.00 | 0.00 | 0.00 | 0.00 | 0.00 | 0.00 | 0.00 | 1.00 | 0.00 | 0.00 |
| , | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 9 | 0.00 | 0.00 | 0.00 | 0.00 | 0.00 | 0.00 | 0.00 | 0.00 | 0.00 | 0.00 | 0.00 | 0.00 | 0.00 | 1.00 | 0.00 |
| 8 | 0.00 | 0.00 | 0.00 | 0.00 | 0.00 | 0.00 | 0.00 | 0.00 | 0.00 | 0.00 | 0.00 | 0.00 | 0.00 | 1.00 | 0.00 |
| 1 | 0.00 | 0.00 | 0.00 | 0.00 | 0.00 | 0.00 | 0.00 | 0.00 | 0.00 | 0.00 | 0.00 | 0.00 | 0.00 | 1.00 | 0.00 |
| 0 | 0.00 | 0.00 | 0.00 | 0.00 | 0.00 | 0.00 | 0.00 | 0.00 | 0.00 | 0.00 | 0.00 | 0.00 | 0.00 | 1.00 | 0.00 |
| 4 | 0.00 | 0.00 | 0.00 | 0.00 | 0.00 | 0.00 | 0.00 | 0.00 | 0.00 | 0.00 | 0.00 | 0.00 | 0.00 | 1.00 | 0.00 |
| , | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| U | 0.00 | 0.00 | 0.00 | 0.00 | 0.00 | 0.00 | 0.00 | 0.00 | 0.00 | 0.00 | 0.00 | 0.00 | 0.00 | 0.00 | 1.00 |
| S | 0.00 | 0.00 | 0.00 | 0.00 | 0.00 | 0.00 | 0.00 | 0.00 | 0.00 | 0.00 | 0.00 | 0.00 | 0.00 | 0.00 | 1.00 |

*FIG. 6*

GLOBAL ADDRESS PARSER

BACKGROUND

The present disclosure pertains to parsing of addresses. Addresses are the unique identifiers that people use to describe geographic locations or places. Addresses are important for modern Internet-connected life, such as delivery services, map search, travel and accommodations, etc. However, an address (e.g., typed as string) input by a person may not be directly recognized and processed by computer systems. In order addresses input by a person to be recognized and processed by a computer, the computer may need to parse the input address into separate component parts, such as house number, street type, street name, postcode, city, state, country, etc. An address parser can provide functionality to parse such free form addresses input by a person into structured address components.

Rule based (e.g., regular expression based) addresses parsers may have certain disadvantages. For instance, rule-based address parsers may be complex and may perform poorly in certain situations. Furthermore, rule based address parsers may be difficult to maintain and it may be difficult to expand a particular rule based parser to support global addresses, instead of addresses for a specific country or locality. Parsing the different address formats used across the globe may require experts with strong domain knowledge to prepare and tune the rules.

Accordingly, there is a need for improved address parsing techniques. The present disclosure addresses these issue and others, as further described below.

SUMMARY

One implementation provides a computer device including one or more processors. The computer device further includes machine-readable medium coupled to the one or more processors and storing computer program code. The computer program code includes sets instructions executable by the one or more processors. The instructions are executable to obtain an address including a plurality of characters. The instructions are further executable to apply the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records. The plurality of modifications are based on the plurality of address component types. The instructions are further executable to parse the output based on the indications of the address component type for each character of the plurality of characters to obtain a plurality of labeled address components for the address. The instructions are further executable to compare the plurality of labeled address components for the address to the plurality of reference address records to determine a matched address record. The matched address record identifies a geographic location corresponding to the address.

Another implementation provides one or more non-transitory computer-readable medium storing computer program code. The computer program code includes sets of instructions to obtain an address including a plurality of characters. The computer program code further includes sets of instructions to apply the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records based on the plurality of address component types. The computer program code further includes sets of instructions to parse the output based on the indications of the address component type for each character of the plurality of characters to obtain a plurality of labeled address components for the address. The computer program code further includes sets of instructions to compare the plurality of labeled address components for the address to the plurality of reference address records to determine a matched record. The matched record identifies a geographic location corresponding to the address.

Another implementation provides a computer-implemented method. The method includes obtaining an address including a plurality of characters. The method further includes applying the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records based on the plurality of address component types. The method further includes parsing the output based on the indications of the address component type for each character of the plurality of characters to obtain a plurality of labeled address components for the address. The method further includes comparing the plurality of labeled address components for the address to the plurality of reference address records to determine a matched address record. The matched address record identifies a geographic location corresponding to the address.

The following detailed description and accompanying drawings provide a better understanding of the nature and advantages of the present disclosure.

BRIEF DESCRIPTION OF THE DRAWINGS

FIG. 5 shows an exemplary input representation that may be applied to an address parsing model, according to an embodiment.

FIG. 6 shows an exemplary output representation from an address parsing model, according to an embodiment.

DETAILED DESCRIPTION

Figure 1:
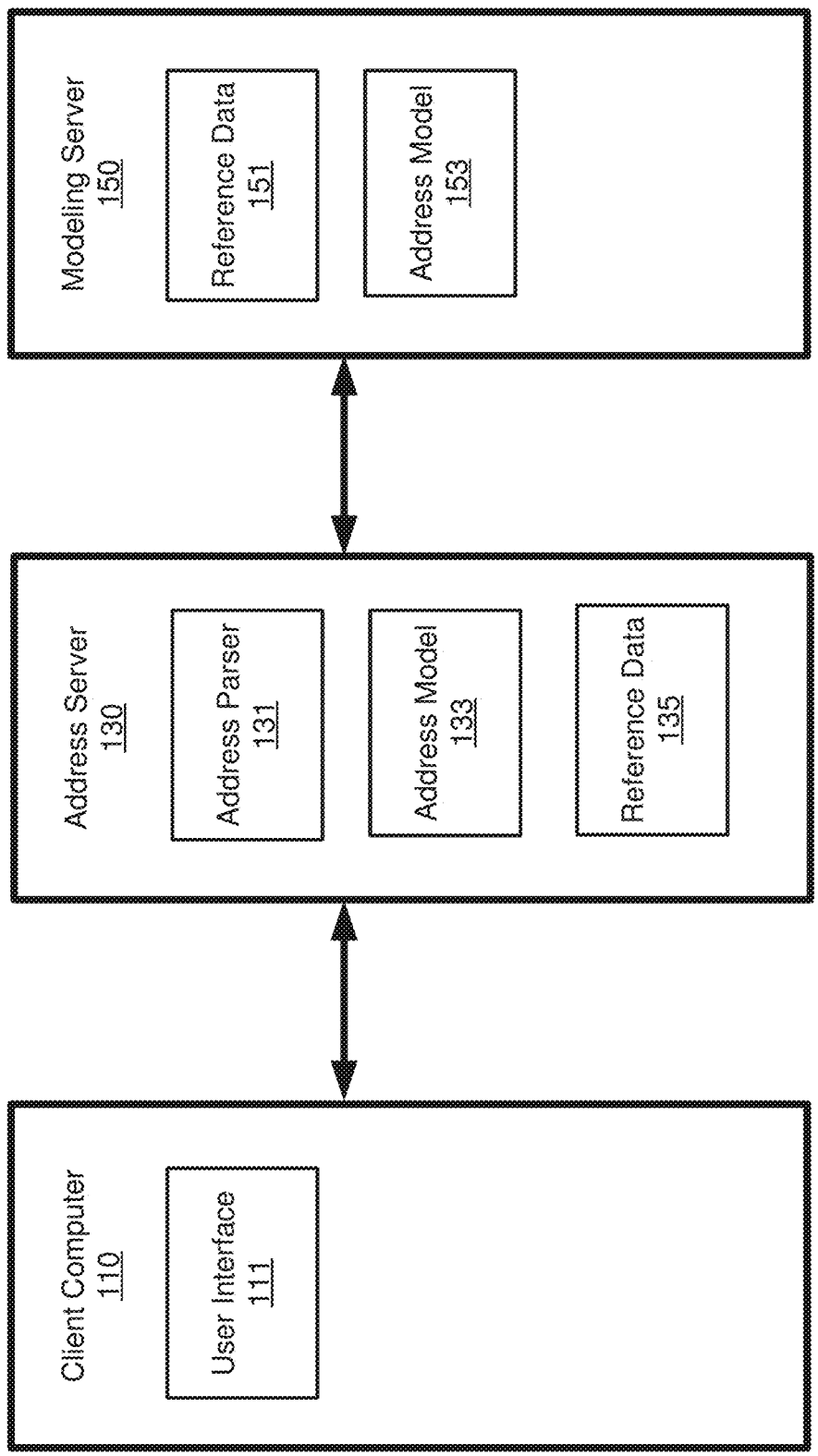
FIG. 1 shows a diagram of an address parsing system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, rule based (e.g., regular expression based) addresses parsers may have certain disadvantages. For instance, rule-based address parsers may be complex and may perform poorly in certain situations. Furthermore, rule based address parsers may be difficult to maintain and it may be difficult to expand a particular rule based parser to support global addresses, instead of addresses for a specific country or locality. Parsing the different address formats used across the globe may require experts with strong domain knowledge to prepare and tune the rules.

Some of the disadvantages of rule-based parsers are that they need to collect an identifier dictionary for assigning word meanings and they require experts having strong address domain knowledge to write address line parsing rules, which are complicated and time consuming. Another disadvantage is that certain rule based parsers may include a complicated preprocessing stage requiring word splits and assigning meaning to each word by looking up against dictionary, which is pre-collected per country. Another disadvantage is that address parsing rules based on regular expressions require a large amount of computer processing resources, and thus are slow to process. Another disadvantage of certain rule based address parsers is that they include complicated preprocess step that requires numerous queries to a database, reducing performance. Another disadvantage of certain rule based address parsers is that there may be numerous keywords and rules for each country, and any changes will impact a numerous parsing rules, require large efforts on the part of domain experts to tune the rules. Another disadvantage of certain rule based address parsers is that it is time consuming and requires tremendous efforts on the part of domain experts to support new countries, as keywords and rules for every new country need to be prepared and well-tuned.

The present disclosure describes address parsing techniques using a deep learning model which provides advantages over rule based address parsers. For instance, deep learning may be used to perform text classification in nature language processing (NLP). The present disclosure applies deep learning to address parsing to overcome the disadvantages of rule-based address parser. The improved address parser may use a bi-directional recurrent neural network (RNN) to enable the use of information in the past and future. The improved address parser may use Long Short-Term Memory (LSTM) Recurrent Neural Networks to enable remembering information over a long period of time. The improved address parser may use multi-layer RNN to make the network deeper and to train it faster to achieve improved results. The improved address parser may use a typographical error generator and double metaphone based phonetic similarity generator for training and data preparation to prevent overfitting problem.

Compared to rule based parsers, the improved address parser is robust, easy to maintain, and provides improved performance. For instance, in order to support new countries, the improved address parser may use reference data for the new country to train the model, without requiring a large efforts on the part of domain experts.

The improved address parsing techniques are explained in further detail below.

FIG. 1 shows a diagram of an address parsing system, according to an embodiment. The address parsing system includes a client computer 110, an address server 130, and a modeling server 150. The client computer 110 may be a personal computer, laptop, smartphone, tablet computer, or wearable device, for example. The address server 130 may be a server computer or a system including multiple server computers, such as a web server or cloud-based platform server, for example. The modeling server 150 may also be a server computer or a system including multiple server computers. In some implementations, the functions of the address server 130 and the modeling server 150 may be performed by the same server or by the same system.

The client computer 110 may be configured to communicate with the address server 130 over a network, such as the internet or a local intranet. The address server 130 may be configured to communicate with the modeling server 150 over a network, such as the internet or a local intranet.

The client computer 110 includes a user interface 111. A user of the client computer 110 may input an address to the user interface 111. For example, the address may be used for delivery services, map searching, travel and accommodations, etc. The address may be sent to the address server 130 to be parsed such that it can be processed by the address server 130 or another (e.g., in order to provide the delivery services, map searching, travel and accommodations, etc.).

The address server 130 includes an address parser 131, an address model 133, and reference data 135. The address server 130 can process the address input by the user to match it to a valid address. The address parser 131 may pre-process the address received from the client computer 110, as further described below. The preprocessed address may be input to the address model 133. In some implementations, the address model 133 may be a multi-layer bi-directional long short-term memory recurrent neural network model. The output of the address model may be processed by the address parser 131 and compared to the reference data 135. The reference data may include a verified list of address records for a particular country or locality. The reference data may be verified by a postal service of that country or locality. Using the address model 133, the address input by the user can be matched to a valid address in the reference data 135, even if the address input by the user includes typographical or formatting errors, as further described below.

The modeling server 150 includes reference data 151 and an address model 153. The modeling server may be configured to generate the address model 153 using the reference data 151. The reference data 151 at the modeling server 150 may be the same as the reference data 135 or it may be different. For example, the reference data 151 at the modeling server 150 may include reference address records for multiple countries while the reference data 131 at the address server may include reference address records for a single country or locality. The modeling server 150 may generate and maintain training data and address models such that they can be provided to address servers, such as the address server 130. The use of the address model for address parsing and the generation of the address model is further described below.

Figure 2:
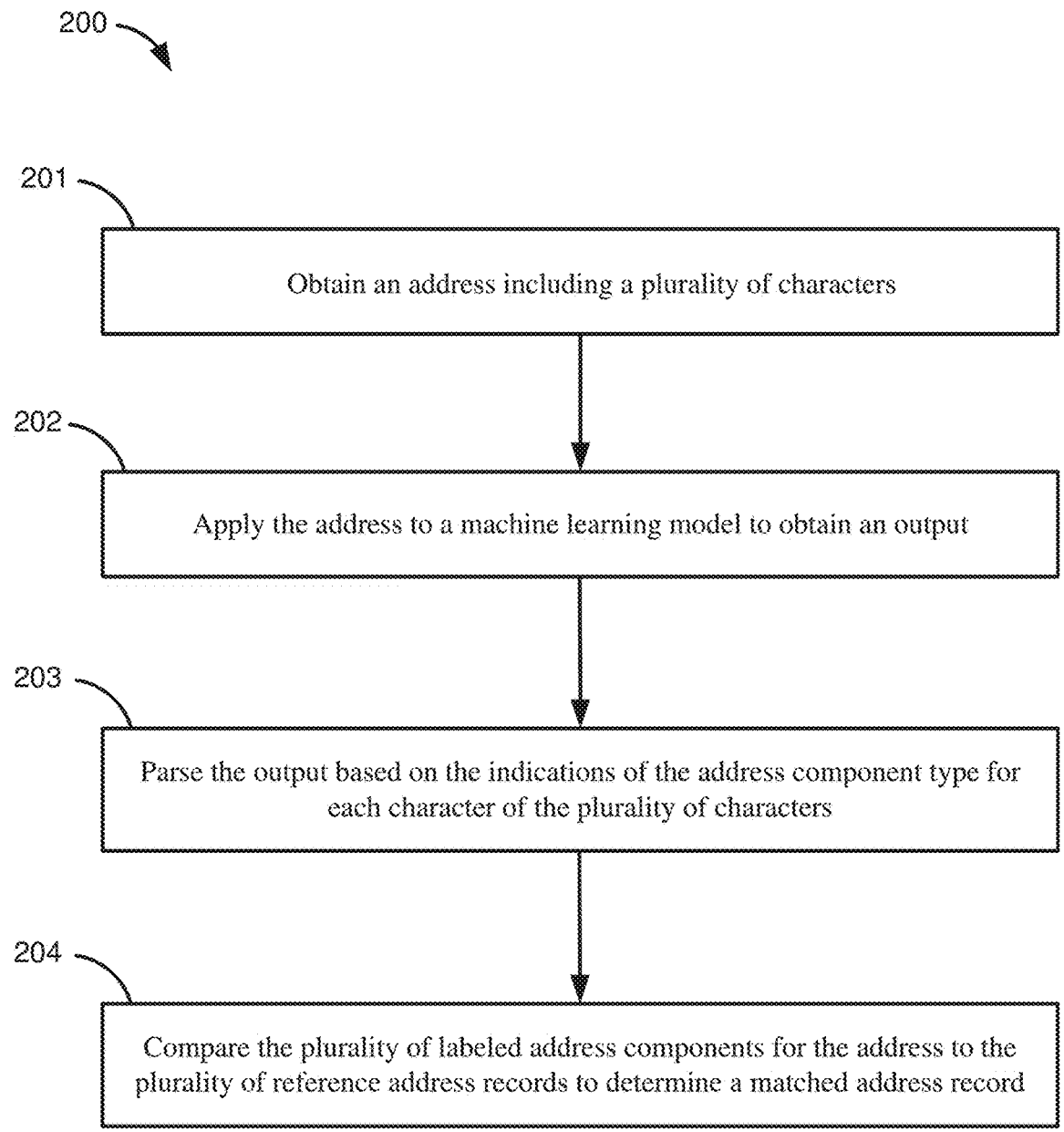
FIG. 2 shows a flowchart of a method for address parsing, according to an embodiment.

FIG. 2 shows a flowchart 200 of a method for address parsing, according to an embodiment. The method may be implemented by the address server 130 described above, for example.

At 201, the method obtains an address including a plurality of characters. The address may be input by a user to a user interface as described above. For example, the plurality of characters in the address may be: "100 main street, Seattle, WA 98104, US". In some implementations, the method applies a character embedding model to the address to obtain a character embedded address.

At 202, the method applies the address to a deep learning model to obtain an output. In some implementations, the deep learning model may be a multi-layer bi-directional long short-term memory recurrent neural network model. The deep learning model is further described below.

The output of the model includes indications of an address component type from among a plurality of address component types for each character of the plurality of characters of the address. Address component types refers to the different parts of an address, such as separators (e.g., a comma or space), a unit number, a unit description, a floor number, a floor description, a building name, a primary number, a primary name, a primary type, a primary prefix, a primary postfix, a locality, a region, a postcode, or a country, for example.

The deep learning model may be trained using a plurality of reference address records and a plurality of modifications to the plurality of reference address records based on the plurality of address component types. In some implementations, the method generates the plurality of modifications to the plurality of reference address records by modifying, adding, or removing one or more characters in a subset of the plurality of reference address records. The method may also create training data based on the plurality of reference address records and the plurality of modifications. The method further includes generating the deep learning model using the training data. In some implementations, the plurality of modifications to the plurality of reference address records may be based on one or more of address equivalence rules, typographical errors, and phonetic similarity rules.

At 203, the method parses the output of the model based on the indications of the address component type for each character of the plurality of characters to obtain a plurality of labeled address components for the address. The parsing of the output is further described below. In some implementation the method applies a classification function to the output to obtain a classified output.

At 204, the method compares the plurality of labeled address components for the address to the plurality of reference address records to determine a matched address record. The matched address record identifies a geographic location corresponding to the address. In some implementations the method generates a standardized address based on the matched address record. The standardized address may be formatted according to a plurality of standardization rules and indicates one or more address component types of the plurality of address component types.

Figure 3:
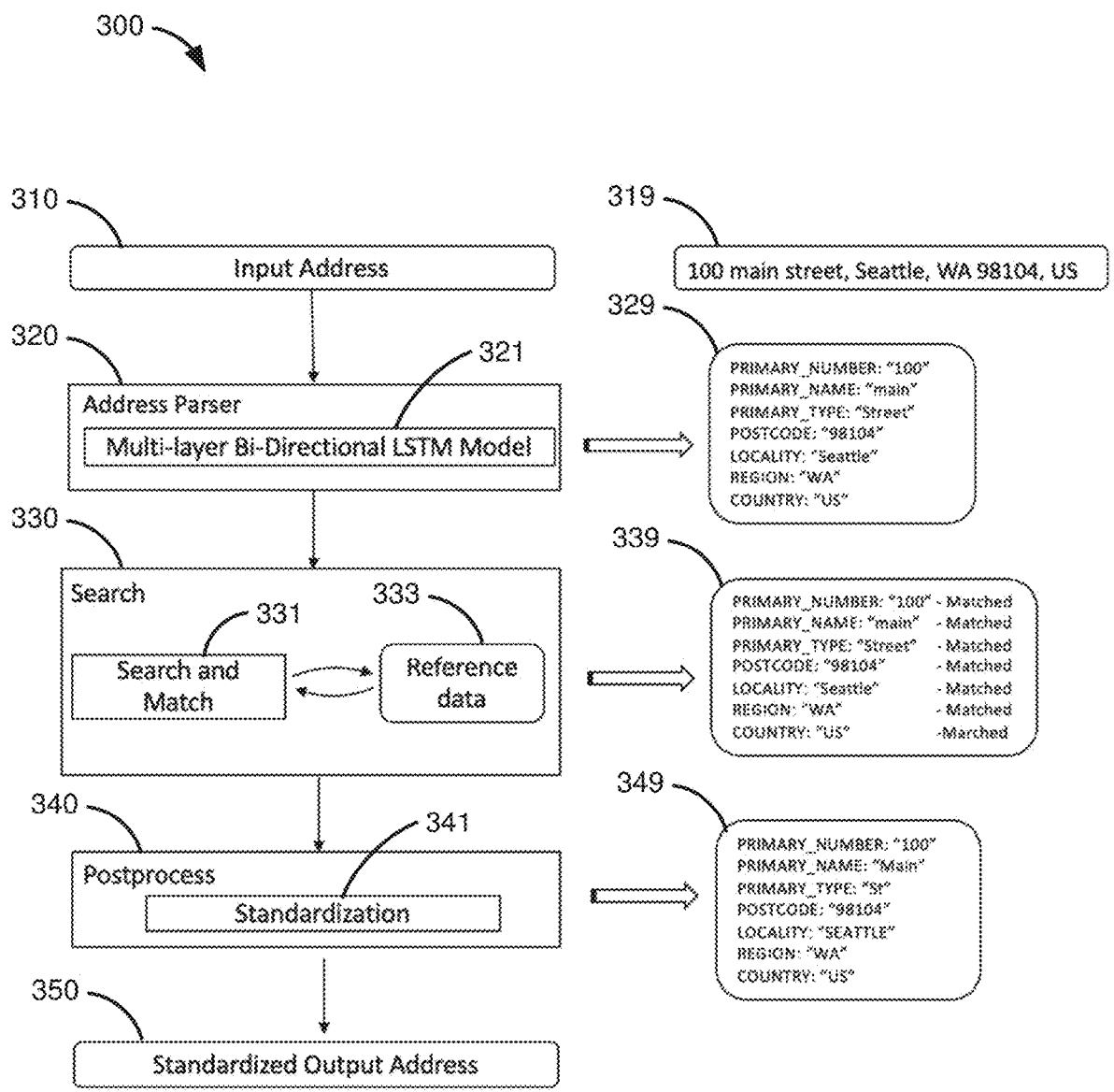
FIG. 3 shows an address transformation process using deep learning, according to an embodiment.

FIG. 3 shows an address transformation process 300 using deep learning, according to an embodiment. The address transformation process 300 may receive an input address 310, parse the address using an address parser 320 based on a deep learning model 321, search and match 331 the address to a valid address in reference data 333, perform postprocessing 340 of the address, including standardization 341, and then output a standardized output address 350. An address transformation process using an exemplary input address to obtain a standardized output address is described below.

To perform address transformation, an input address 310 is obtained. The address includes a plurality of characters (e.g., letters, numbers, symbols, etc.). The input address 319 in this example is:

100 main street, Seattle, WA 98104, US

The input address 310 may be obtained by an address parser 320. For example, the address parser 320 may be implemented by a computer program executed by a server, such as the address server described herein. The address parser 320 may apply the address to a deep learning model to obtain an output. In some implementations, the address parser 320 can preprocess the address before it is applied to the deep learning model 321. In some implementations, the deep learning model 321 may be a multi-layer bi-directional long short-term memory recurrent neural network model. The structure, function, and generation of the deep learning model is further described below.

In this example, the output 329 of the deep learning model is a plurality of labeled address components for the address:

PRIMARY_NUMBER: "100"
PRIMARY_NAME: "main"
PRIMARY_TYPE: "Street"
POSTCODE: "98104"
LOCALITY: "Seattle"
REGION: "WA"
COUNTRY: "US"

The output 329 of the model 321 includes indications, or labels, of an address component type from for each character of the plurality of characters of the address. For instance, the characters "100" are indicated as being the "PRIMARY_NUMBER" type of address component, the characters "main" are indicated as being the "PRIMARY_NAME" type of address component, the characters "Street" are indicated as being the "PRIMARY_TYPE" type of address component, and so on. The Address component types refers to the different parts of an address, such as separators, a unit number, a unit description, a floor number, a floor description, a building name, a primary number, a primary name, a primary type, a primary prefix, a primary postfix, a locality, a region, a postcode, or a country, for example. In other implementations, different or additional address component types may be used according to the address component types of the reference data 333.

The output 329 of the model is provided to an address search function 330. For example, the address search 330 may be implemented by a computer program executed by a server, such as the address server described herein. Address search 330 includes searching and matching 331 of reference data 333. For example, the search function 330 may compare the plurality of labeled address components of the output to a plurality of reference address records in the reference data 333 to determine a matched address record 339. In some implementations, the output of the model may be postprocessed before it is compared to the reference data 333

The reference data 333 may include valid address records provided by a post office or other organization for address in a particular country or locality, for example. The matched address record 339 is the valid address in the reference data 333 that best matches the output of the model. In some cases, there will be a partial match to more than one valid address in the reference data 333. In this example, the matched address record 339 may be:

PRIMARY_NUMBER: "100"—Matched
PRIMARY_NAME: "main"—Matched
PRIMARY_TYPE: "Street"—Matched
POSTCODE: "98104"—Matched
LOCALITY: "Seattle"—Matched
REGION: "WA"—Matched
COUNTRY: "US"—Matched The results of the address search 330 are provided to an address postprocessor 340. For example, the address postprocessor 340 may be implemented by a computer program executed by a server, such as the address server described herein. The address postprocessor 340 may provide information about an assignment level, such as indications of which address components were exactly matched and which address components were partially matched with the reference data 333. For instance, a match algorithms (e.g., an edit distance match algorithm) may be applied and provide a match score. For example, "Main" in the model output may match "MAIN" in the reference data 333 with a score 100 while "Maim" may match "MAIN" with a score 80.

The address postprocessor 340 may output a standardized output address 350. The standardized output address 350 may include formatted address components based on a pre-determined set of rules or requirements. For example, standardization rules may be used to standardizes the address using capitalize words and the short name for street type. For this example, input 319, the standardized output 349 is:

PRIMARY_NUMBER: "100"
PRIMARY_NAME: "Main"
PRIMARY_TYPE: "St"
POSTCODE: "98104"
LOCALITY: "Seattle"
REGION: "WA"
COUNTRY: "US"

As shown, the address uses capitalize words (e.g., "Main") and the short name for street type (e.g., "St").

Thus, an address transformation process 300 can use a deep learning model to determine a valid and standardized output address 350 given an input address 310 input by a person. The deep learning model is further described below with respect to FIG. 4.

Figure 4:
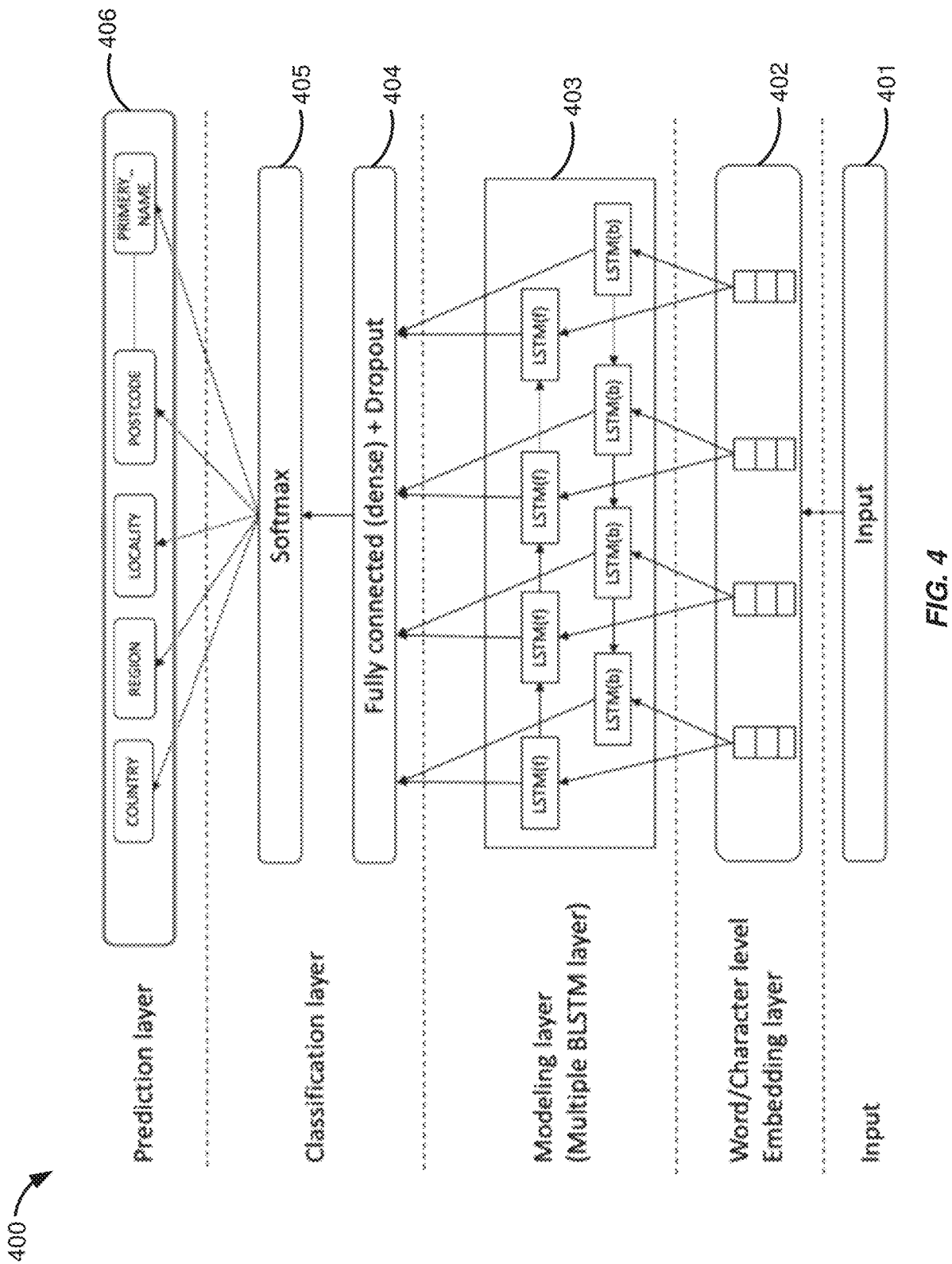
FIG. 4 shows a deep learning address model, according to an embodiment.

FIG. 4 shows a deep learning address model 400, according to an embodiment. In some implementations, the address model 400 may be generated by the modeling server 150, or the address server 130, described above. The model 400 receives an input 401, such as an address input by a person to a user interface. The model 400 may include an embedding layer 402 to apply word or character embedding. The model may also include a modeling layer 403. The modeling layer 403 may include a Multi-layer Bi-directional Long Short-Term Memory (BLSTM) Recurrent Neural Network (RNN). The model may also include a classification layer to process the output of the modeling layer. The output of the classification layer may be processed by a prediction layer 405. The layers of the model 400 are described in further detail below.

In the implementation shown in FIG. 4, the model 400 Recurrent Neural Networks. A Recurrent Neural Networks may be configured to solve problems in Natural Language Processing. An RNN may be used to make predictions in a sequence. For example, in Language Modeling and Generating Text, if given a sequence of words an RNN may predict the likelihood of the next word. An RNN may enable previous outputs to be used as inputs while having hidden states. Generally, an RNN may read inputs (such as words) one at a time, and remember some information or context through a hidden layer activation that may be passed from one time step to the next. This allows the RNN to use information from the past to process later inputs.

However, traditional RNN have certain limitations. For instance, one limitation is that the information in the future may not be taken into account. In addition, RNNs may not be effective in capturing long term dependencies.

Bidirectional Recursive Neural Networks may solve the limitations of traditional RNNs. For example, in text generating, "It is _ apple." The missing words could be "a" or "an" if using an RNN, since an RNN may only use information in the past. However, when using a Bidirectional Recursive Neural Networks, the information in the future, which in this example is the word "apple," may help to predict that the missing word is "an."

Another limitation of traditional RNNs is that they may not be able to remember information for long periods of time. For example, in text generating, "The apples on the table _ red." The correct prediction on missing word should be "are." However, the missing word may be predicted to be "is" if using a traditional RNN, since only the information "table" may be used to predict the next word. Thus, one problem is that the RNN may not remember the word "apples" over a long period of time. However, a Long Short-Term Memory (LSTM) networks may be used to solve such long-term dependency problems.

Accordingly, in some implementations the address parser may use a Multi-layer Bi-Directional LSTM for the address model. However, in implementations may not implement all of these features of a neural network. In some implementations other types of neural networks may be used by the address parser. In some implementations, other types of deep learning models may be used by the address parser.

Referring back to FIG. 4, an input layer may obtain an input 401 such as an address string (e.g., a string of characters indicating an address). For example:

100 main street, Seattle, WA 98104, US

The input may be embedded by an embedding layer 402 before the address it provided to the modeling layer 403. An embedding 402 may map input data from high-dimensional data into a lower-dimensional space. Embeddings may make it easier to perform machine learning on large inputs such as sparse vectors representing words. Embeddings may be based on word or character.

Word embedding refers to the representation of words as vectors in a continuous space, thereby capturing many syntactic and semantic relations among them. However, word embedding may encounter the out of vocabulary (OOV) issue. That is, it may be hard to collect all the words into vocabulary. In such cases, word embedding may not able to embed those words that are not in the vocabulary. Also, with large amount of words, word embedding may require a large amount of storage and computing resources.

Character embedding refer to a character-aware neural language model that learns character word representations using RNNs. Character embedding may avoid the out of vocabulary issue in word embedding. With character-based embedding, the space (dimension of vector) may be dramatically decreased comparing to word-based embedding. For example, a list of characters can be defined with using alphanumeric and some special characters. This could be English characters (52), number (10), special characters (20) and one unknown character, (UNK). A total of 83 characters, for example. With 83 characters, character embedding may cover all words written in Latin script. Another advantage of character-based embedding is that may handle misspellings. Thus, the embedding layer 402 may use character-based embedding by the address parser. In some implementations, a combination of word-based and character-based embeddings may be used by the address parser.

As discussed above, Bi-Directional Long Short-Term Memory (BLSTM) neural networks may be able to use information in the past and future. In addition, BLSTMs may also look into long term memory. Accordingly, in some implementations the modeling layer 403 may use BLSTM networks. In some implementations, multi-layer BLSTM networks may be used. By means of multiple layers, outputs at each step may be fed in as the inputs to another BLSTM.

Generally, a Multi-layer BLSTM architecture may be defined as a LSTM model comprised of multiple BLSTM layers as shown in FIG. 4.

One advantage of multiple layers is that additional hidden layers may make the model deeper. Increasing the depth of the network is a type of representational optimization that may requires fewer neurons and may train faster. The additional hidden layers may recombine the learned representation from prior layers and create new representations at high levels of abstraction. For example, from lines to shapes to objects.

The bi-directional functionality may be effective in the following example situation. Consider an address:

100 Street Road, New Hope, Pa. 18938

Generally, both "Street" and "Road" are street types. But in this case, "Street" is the street name, and "Road" is the street type. Without looking to the future word "Road," the word "Street" may not be able to be identified as street name this address.

Accordingly, BLSTMs may be advantageous in parsing addresses. However, in some implementations different types of neural networks may be used instead.

The output modeling layer 403 may be provided to a classification layer. For instance, an output of forward and backwards pass in the BLSTM model may be combined together as a fully connected layer 404, or "dense" layer. The dense layer 404 may be a "fully connected" layer in that all the neurons in a layer are connected to those in the next layer. One advantage of a fully connected layer is that it may provide learning features from all the combinations of the features of the previous layer. In addition, a "dropout" may be placed on the fully connected layer to preventing overfitting. "Dropout" refers to a regularization technique for preventing overfitting in the network. Then the output of the fully connected layer may be provided to a classification function 405, such as the Softmax function for classification.

The output of the classification layer is provided to a prediction layer 406. The prediction layer 406 obtains the result of prediction from the address model. The output may contain possibility vector of pre-defined labels. The labels may be similar to or based on the address component types. For example, the labels may include SEPARATOR, UNIT_NUMBER, UNIT_DESCRIPTION, FLOOR_NUMBER, FLOOR_DESCRIPTION, BUILDING_NAME, PRIMARY_NUMBER, PRIMARY_NAME, PRIMARY_TYPE, PRIMARY_PREFIX, PRIMARY_POSTFIX, LOCALITY, REGION, POSTCODE, COUNTRY, STAIRWELL_NAME, WING_NAME, for example. The label "SEPARATOR" may be used to classify special characters among address components.

The output of the prediction layer 406 may then be used in a search and match, such as the one described above with respect to FIG. 3. Thus, a deep learning model may be used to perform address parsing. However, a model may be improved by improving the training data used to generate the model.

For instance, addresses input by people may have various formats. For example, the postcode or the region might be missing in the address, the address may include misspellings, or the address components may be in a different order, etc. The training data may be prepared in order to generate a robust model. The training data may be obtained from the reference data. The reference data may be referred to as "truth data" since it may be obtained from an official organization, such as post offices of various countries or Universal Postal Union (UPU) data, for example. Accordingly, the addresses in the reference data may be treated as complete, correct, and formal addresses. The Addresses may be separated into address components. In some implementations, address components may be stored in columns of a database. The training data may also include labeled from people or organizations. Such address data may help build a robust model as those addresses are most likely appears in real world inputs.

In addition to including original addresses from reference data, the training data may also include modifications to the reference data. For example, addresses may be generated using permutations that may be likely to appear in real inputs by people. Such modifications may help to prevent overfitting in the model.

An example of reference data is shown in Table (1) below:

TABLE 1

| UNIT NUM | UNIT DESC | FLOOR NUM | FLOOR DESC | BLDG NAME | PRMY NUM | PRMY NAME | PRMY TYPE | PRMY PREFIX | PRMY POSTFIX | POSTCODE | LOCALITY | REGION | COUNTRY |
|---|---|---|---|---|---|---|---|---|---|---|---|---|---|
| | | | | | 100 | MAIN | ST | | | 98104 | SEATTLE | WA | US |
| 101 | RM | 1 | FL | | 100 | MAIN | ST | WEST | | 90012 | LOS ANGELES | CA | US |
| 801 | RM | 8 | FL | SPRING PLAZA | 100 | MAIN | ST | | EAST | 54601 | LA CROSSE | WI | US |

For the address model, each column of the reference data may be treated as a feature. SEPARATOR (e.g., comma, space, etc.) may also be a feature. The labels may be the same as the features. Training data for the model may be generated from the reference data. For example, all the columns may be combined with separators into a single address, such as:

100 MAIN ST, SEATTLE, WA 98104, US

If character-based embeddings are used, the address's internal representation applied to the model may be as shown in FIG. 5. In addition, the characters may be encoded with the embeddings instead of original letters before being provided to the model. FIG. 5 shows an exemplary input representation 500 that may be applied to an address model, according to an embodiment.

Data augmentation, noise generation, typographical error generation, and phonetic similarity techniques may be used, alone or in combination, to prepare additional training data based on the reference data for use in training the model.

Data augmentation refers to randomly producing a variety of permutations as additional addresses.

In one example of data augmentation, separators (e.g. space ",", "/" etc.) may be added among address components when generating addresses. For example, adding "," to address, "100, MAIN ST, SEATTLE, Wash., 98104, US." For example, adding "/" to address, "100/MAIN ST/SEATTLE/WA/98104/US." For example, randomly added space, "/", "," to address, "100 MAIN ST, SEATTLE/WA/98104, US."

In another example, Latin characters may be changed to capital characters. For example, "a" to "A", "á" to "A", etc.

In another example, unit/floor/street type abbreviation may be changed to full names. For example, "RM" to "ROOM", "FL" to "FLOOR", "ST" to "STREET", "RD" to "ROAD" etc.

In another example, floor/street numbers may be converted to ordinal/cardinal words. For example, "1" to "1st" or "first".

In another example, region/country abbreviation may be converted to full names. For example, "WA" to "WASHINGTON", "US" to "UNITED STATES" etc.

In another example, the postcode/locality/region/country may be discarded. For example, "100 main St, Seattle, US" or "100 main St, Seattle, WA".

In another example, the unit type/primary number may be discarded. For example, "main St, Seattle, WA, US".

In another example, the order of postcode/locality/region may be changed. For example, "100 main St, 98104, Seattle, WA, US".

For example, the following record in the reference data:
100, MAIN ST, SEATTLE, WA 98104, US
could be modified into the following set of addresses based on some of the data augmentations described above:
100, MAIN ST, SEATTLE, WA 98104, US
100 MAIN ST/SEATTLE/WA 98104/US
100 MAIN STREET, SEATTLE, WASHINGTON 98104, UNITED STATES
100 MAIN ST, SEATTLE, 98104 WA, US
100 MAIN ST, SEATTLE, Wash., US Noise generation is another technique for modifying the reference data to improve the training data. Noise may be produced by randomly generating misspellings. Since addresses are typed by humans into a computer, each of address component might be misspelled. The training data may include misspellings such that the model can handle misspellings. Typographical errors and phonetic misspellings may be used to create noisy data.

One example typographical error is deletion of a character. For example, "main" to "man".

Another example typographical error is substitution. For example, substitution of nearby characters on a keyboard. For example, "main" to "maun".

Another example typographical error is duplication. For example, "main" to "maiin" with duplicate "i".

Another example typographical error is transposition. For example, "main" to "mian".

Phonetic misspellings are also likely to be made by humans. A double metaphone algorithm may be used to determine similar pronunciations, for example. The algorithm may group words with similar pronunciations into a common representation by using pre-defined pronunciation rules. The training data may include randomly applied common pronunciations rules extracted from a double metaphone algorithm.

One example phonetic misspelling is to transform the beginning of the word using the following rules: KN→N, GN→N, PN→N, AE→E, WR→R. For example, "Knock" to "nock."

Another example phonetic misspelling is to replace "C" using the following rules:
With X: CIA→XIA, SCH→SKH, CH→XH
With S: CI→SI, CE→SE, CY→SY
With K: C→K For example, "class" to "klass."

Another example phonetic misspelling is to replace GH→H at the end or before a vowel. For example, "high" to "hih."

Another example phonetic misspelling is to replace GN→N and GNED→NED if they are at the end. For example, "sign" to "sin."

Another example phonetic misspelling is to perform following transformations using the rules below: CK→K, PH→F, Q→K, V→F, Z→S. For example, "phone" to "fone."

Another example phonetic misspelling is to Transform WH→W at the beginning. Remove "W" if there is no vowel after it. For example, "white" to "wite."

After training the model, the trained model may be used to perform address parsing as discussed herein. As described above with respect to FIG. 4, the input address may be encoded and applied to a multi-layer BLSTM Recurrent Neural Network. The outputs from the forward and backward pass may then be concatenated and fed through a fully connected (e.g., "dense") layer with activations to produce logits for each class. The final output probabilities may be generated through a Softmax function, for example. An example output address for the example input address "100 MAIN ST, SEATTLE, WA 98104, US" is shown in FIG. 6.

FIG. 6 shows an exemplary output representation 600 from an address parsing model, according to an embodiment. In this representation, the values (from 0 to 1) are rounded to two decimals and are formatted to gray scales.

Accordingly, the output of the model may be parsed into readable address components:
PRIMARY_NUMBER: 100
PRIMARY_NAME: MAIN
PRIMARY_TYPE: ST
POSTCODE: 98104
LOCALITY: SEATTLE
REGION: WA
COUNTRY: US The result of address parser may be further processed in post processing as discussed above. Assignment level information may also be determined (e.g., which address components are exactly matched or partial matched with reference data). Match algorithms (e.g., edit distance match algorithm) may also be applied to the parsed address to provide a match score. For example, "Main" is matched "MAIN" in reference data with a score 100 while "Maim" is matched "MAIN" with a score 80.

Accordingly, a deep learning model may be improved by training it using modifying reference address records. Furthermore, using the deep learning model may avoid the disadvantages of rule based address parsers discussed above.

The following are additional exemplary implementations of the address parsing techniques described herein.

One implementation provides a computer device including one or more processors. The computer device further includes machine-readable medium coupled to the one or more processors and storing computer program code. The computer program code includes sets instructions executable by the one or more processors. The instructions are executable to obtain an address including a plurality of characters. The instructions are further executable to apply the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records. The plurality of modifications are based on the plurality of address component types. The instructions are further executable to parse the output based on the indications of the address component type for each character of the plurality of characters to obtain a plurality of labeled address components for the address. The instructions are further executable to compare the plurality of labeled address components for the address to the plurality of reference address records to determine a matched address record. The matched address record identifies a geographic location corresponding to the address.

In some implementations of the computer device, the instructions are further executable to generate the plurality of modifications to the plurality of reference address records by modifying, adding, or removing one or more characters in a subset of the plurality of reference address records. The instructions are further executable to create training data based on the plurality of reference address records and the plurality of modifications. The instructions are further executable to generate the deep learning model using the training data.

In some implementations of the computer device, the plurality of modifications to the plurality of reference address records are based on one or more of address equivalence rules, typographical errors, and phonetic similarity rules.

In some implementations of the computer device, the instructions are further executable to apply a character embedding model to the address to obtain a character embedded address. In such embodiments, the address applied to the deep learning model is the character embedded address.

In some implementations of the computer device, the instructions are further executable to apply a classification function to the output to obtain a classified output. In such embodiments, the output parsed to obtain the plurality of labeled address components is the classified output.

In some implementations of the computer device, the instructions are further executable to generate a standardized address based on the matched address record. The standardized address may be formatted according to a plurality of standardization rules and may indicate one or more address component types of the plurality of address component types.

In some implementations of the computer device, the deep learning model is a multi-layer bi-directional long short-term memory recurrent neural network model.

Another implementation provides one or more non-transitory computer-readable medium storing computer program code. The computer program code includes sets of instructions to obtain an address including a plurality of characters. The computer program code further includes sets of instructions to apply the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records based on the plurality of address component types. The computer program code further includes sets of instructions to parse the output based on the indications of the address component type for each character of the plurality of characters to obtain a plurality of labeled address components for the address. The computer program code further includes sets of instructions to compare the plurality of labeled address components for the address to the plurality of reference address records to determine a matched record. The matched record identifies a geographic location corresponding to the address.

In some implementations of the one or more non-transitory computer-readable medium, the computer program code further includes sets of instructions to generate the plurality of modifications to the plurality of reference address records by modifying, adding, or removing one or more characters in a subset of the plurality of reference address records. In such implementations, the computer program code further includes sets of instructions to create training data based on the plurality of reference address records and the plurality of modifications. The computer program code further includes sets of instructions to generate the deep learning model using the training data.

In some implementations of the one or more non-transitory computer-readable medium, the plurality of modifications to the plurality of reference address records are based on one or more of address equivalence rules, typographical errors, and phonetic similarity rules.

In some implementations of the one or more non-transitory computer-readable medium, the computer program code further includes sets of instructions to apply a character embedding model to the address to obtain a character embedded address. In such implementations, the address applied to the deep learning model is the character embedded address.

In some implementations of the one or more non-transitory computer-readable medium, the computer program code further includes sets of instructions to apply a classification function to the output to obtain a classified output. In such implementations, the output parsed to obtain the plurality of labeled address components is the classified output.

In some implementations of the one or more non-transitory computer-readable medium, the computer program code further includes sets of instructions to generate a standardized address based on the matched address record. The standardized address is formatted according to a plurality of standardization rules and indicates one or more address component types of the plurality of address component types.

In some implementations of the one or more non-transitory computer-readable medium, the deep learning model is a multi-layer bi-directional long short-term memory recurrent neural network model.

Another implementation provides a computer-implemented method. The method includes obtaining an address including a plurality of characters. The method further includes applying the address to a deep learning model to obtain an output. The output includes indications of an address component type from among a plurality of address component types for each character of the plurality of characters of the address. The deep learning model is trained using a plurality of reference address records and a plurality of modifications to the plurality of reference address records based on the plurality of address component types. The method further includes parsing the output based on the indications of the address component type for each character of the plurality of characters to obtain a plurality of labeled address components for the address. The method further includes comparing the plurality of labeled address components for the address to the plurality of reference address records to determine a matched address record. The matched address record identifies a geographic location corresponding to the address.

In some implementations of the method, the method further includes generating the plurality of modifications to the plurality of reference address records by modifying, adding, or removing one or more characters in a subset of the plurality of reference address records. The method further includes creating training data based on the plurality of reference address records and the plurality of modifications. The method further includes generating the deep learning model using the training data.

In some implementations of the method, the plurality of modifications to the plurality of reference address records are based on one or more of address equivalence rules, typographical errors, and phonetic similarity rules.

In some implementations of the method, the method further includes applying a character embedding model to the address to obtain a character embedded address. In such implementations, the address applied to the deep learning model is the character embedded address.

In some implementations of the method, the method further includes applying a classification function to the output to obtain a classified output. In such implementations, the output parsed to obtain the plurality of labeled address components is the classified output.

In some implementations of the method, the method further includes generating a standardized address based on the matched address record. The standardized address is formatted according to a plurality of standardization rules and indicates one or more address component types of the plurality of address component types.

In some implementations of the method, the deep learning model is a multi-layer bi-directional long short-term memory recurrent neural network model.

Figure 7:
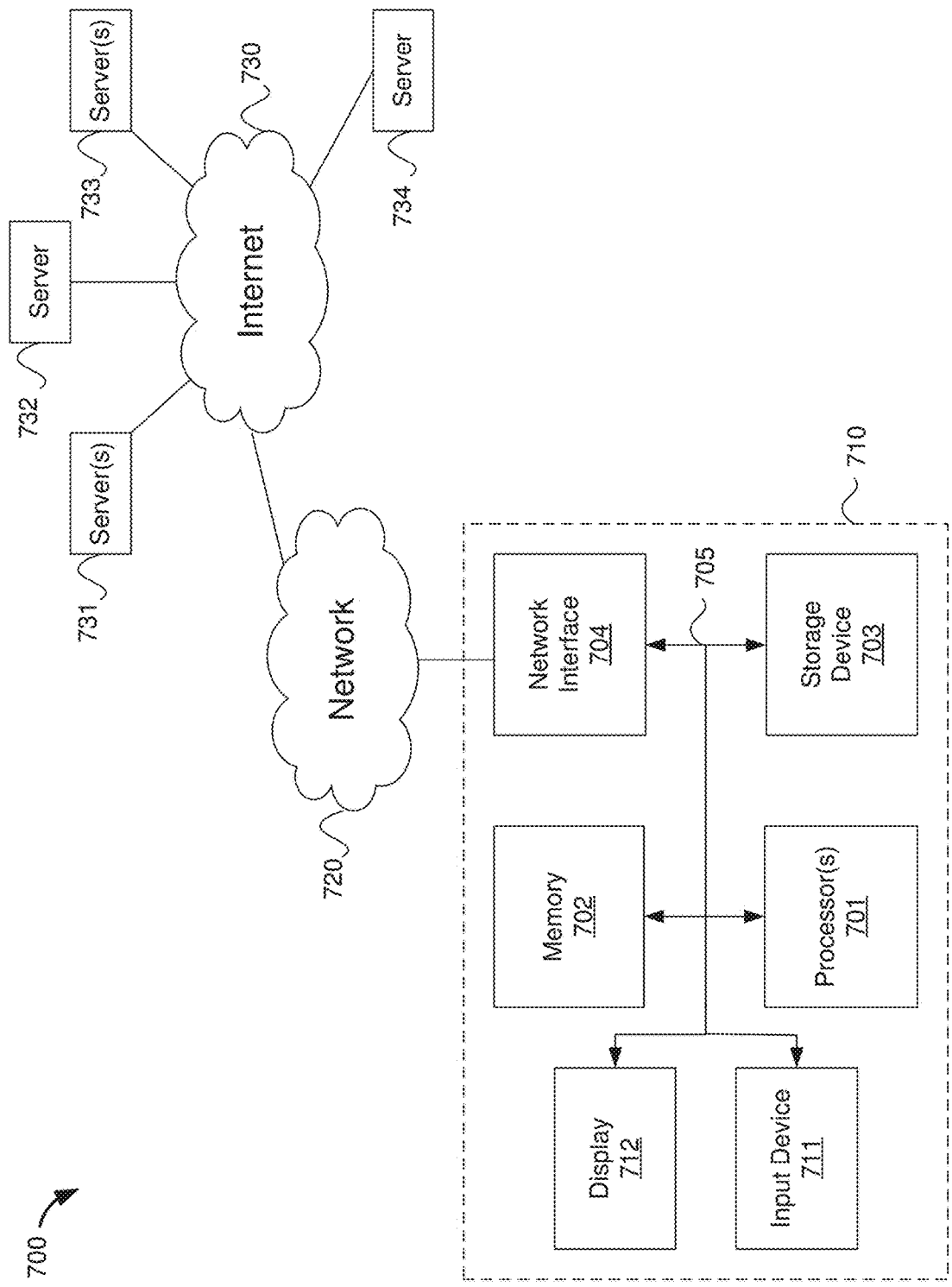
FIG. 7 shows a diagram of hardware of a special purpose computing machine for implementing systems and methods described herein.

FIG. 7 shows a diagram of hardware of a special purpose computing machine for implementing systems and methods described herein. The following hardware description is merely one example. It is to be understood that a variety of computers topologies may be used to implement the above described techniques. The hardware shown in FIG. 7 may be used to implement the address parsing system described herein. For example, the hardware of the computer system 710 of FIG. 7 may be used to implement the client computer 110 of FIG. 1. Similar hardware may be used to implement the address server 130 and the modeling server 150 of FIG. 1. In some implementations, the address server 130 of FIG. 1 may correspond to the server 731 of FIG. 7, and the modeling server 150 of FIG. 1 may correspond to the server 732 of FIG. 7.

An example computer system 710 is illustrated in FIG. 7. The computer system 710 includes a bus 705 or other communication mechanism for communicating information, and one or more processor(s) 701 coupled with bus 705 for processing information. The computer system 710 also includes a memory 702 coupled to bus 705 for storing information and instructions to be executed by processor 701, including information and instructions for performing some of the techniques described above, for example. This memory may also be used for storing programs executed by processor(s) 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 704 may be a wireless or wired connection, for example. The computer system 710 can send and receive information through the network interface 704 across a local area network, an Intranet, a cellular network, or the Internet, for example. In the Internet example, a browser, for example, may access data and features on backend systems that may reside on multiple different hardware servers 731-734 across the network. The servers 731-734 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer device, comprising:
   one or more processors; and
   machine-readable medium coupled to the one or more processors and storing computer program code comprising sets instructions executable by the one or more processors to:
      obtain an address including a plurality of characters;
      apply a character embedding model to the address to obtain a character embedded address;
      train a deep learning model using a plurality of reference address records;
      apply the character embedded address to the deep learning model;
      obtain an output from the deep learning model, the output including indication of an address component type from among a plurality of address component types for each character of the plurality of characters of the address;

parse the output based on the indications of the address component type for each character of the plurality of characters to obtain a plurality of labeled address components for the address; and compare the plurality of labeled address components for the address to the plurality of reference address records to determine a matched address record identifying a geographic location corresponding to the address, wherein the deep learning model comprises:
a plurality of forward and backward pass bi-directional long short-term memory layers configured to receive the character embedded address; and
a fully connected layer having inputs coupled to outputs of the plurality of forward and backward pass bi-directional long short-term memory layers, the fully connected layer comprising a dropout to prevent overfitting.

2. The computer device of claim 1, wherein the computer program code further comprises sets of instructions executable by the one or more processors to:
generate the plurality of modifications to the plurality of reference address records;
create training data based on the plurality of reference address records and the plurality of modifications; and
generate the deep learning model using the training data.

3. The computer device of claim 2, wherein the plurality of modifications to the plurality of reference address records are based on one or more of address equivalence rules, typographical errors, and phonetic similarity rules.

4. The computer device of claim 1, wherein the computer program code further comprises sets of instructions executable by the one or more processors to:
apply a classification function to the output to obtain a classified output, wherein the output parsed to obtain the plurality of labeled address components is the classified output.

5. The computer device of claim 1, wherein the computer program code further comprises sets of instructions executable by the one or more processors to:
generate a standardized address based on the matched address record, the standardized address formatted according to a plurality of standardization rules and indicating one or more address component types of the plurality of address component types.

6. The computer device of claim 1, wherein the deep learning model further comprises:
a softmax layer coupled to outputs of the fully connected layer and perform a softmax function; and
a prediction layer coupled to outputs of the softmax layer to obtain address component types corresponding to the character embedded address.

7. The computer device of claim 1, wherein training the deep learning model further comprises:
applying data augmentation to the plurality of reference address records; and
applying noise generation to the plurality of reference address records, wherein misspellings of the plurality of reference address records are randomly generated and applied to the deep learning model.

8. A non-transitory computer-readable medium storing computer program code comprising sets of instructions to:

obtain an address including a plurality of characters;
apply a character embedding model to the address to obtain a character embedded address;
train a deep learning model using a plurality of reference address records;
apply the character embedded address to the deep learning model;
obtain an output from the deep learning model, the output including indication of an address component type from among a plurality of address component types for each character of the plurality of characters of the address;
parse the output based on the indications of the address component type for each character of the plurality of characters to obtain a plurality of labeled address components for the address; and
compare the plurality of labeled address components for the address to the plurality of reference address records to determine a matched address record identifying a geographic location corresponding to the address,
wherein the deep learning model comprises:
a plurality of forward and backward pass bi-directional long short-term memory layers configured to receive the character embedded address; and
a fully connected layer having inputs coupled to outputs of the plurality of forward and backward pass bi-directional long short-term memory layers, the fully connected layer comprising a dropout to prevent overfitting.

9. The non-transitory computer-readable medium of claim 8, wherein the computer program code further comprises sets of instructions to:
generate the plurality of modifications to the plurality of reference address records;
create training data based on the plurality of reference address records and the plurality of modifications; and
generate the deep learning model using the training data.

10. The non-transitory computer-readable medium of claim 9, wherein the plurality of modifications to the plurality of reference address records are based on one or more of address equivalence rules, typographical errors, and phonetic similarity rules.

11. The non-transitory computer-readable medium of claim 8, wherein the computer program code further comprises sets of instructions to:
apply a classification function to the output to obtain a classified output, wherein the output parsed to obtain the plurality of labeled address components is the classified output.

12. The non-transitory computer-readable medium of claim 8, wherein the computer program code further comprises sets of instructions to:
generate a standardized address based on the matched address record, the standardized address formatted according to a plurality of standardization rules and indicating one or more address component types of the plurality of address component types.

13. The non-transitory computer-readable medium of claim 8, wherein the deep learning model further comprises:
a softmax layer coupled to outputs of the fully connected layer and perform a softmax function; and
a prediction layer coupled to outputs of the softmax layer to obtain address component types corresponding to the character embedded address.

14. The non-transitory computer-readable media of claim 8, wherein training the deep learning model further comprises:

applying data augmentation to the plurality of reference address records; and applying noise generation to the plurality of reference address records, wherein misspellings of the plurality of reference address records are randomly generated and applied to the deep learning model.

15. A computer-implemented method, comprising:

obtaining an address including a plurality of characters;

applying a character embedding model to the address to obtain a character embedded address;

training a deep learning model using a plurality of reference address records;

apply the character embedded address to the deep learning model;

obtain an output from the deep learning model, the output including indication of an address component type from among a plurality of address component types for each character of the plurality of characters of the address;

parsing the output based on the indications of the address component type for each character of the plurality of characters to obtain a plurality of labeled address components for the address; and comparing the plurality of labeled address components for the address to the plurality of reference address records to determine a matched address record identifying a geographic location corresponding to the address, wherein the deep learning model comprises:

a plurality of forward and backward pass bi-directional long short-term memory layers configured to receive the character embedded address; and a fully connected layer having inputs coupled to outputs of the plurality of forward and backward pass bi-directional long short-term memory layers, the fully connected layer comprising a dropout to prevent overfitting.

16. The computer-implemented method of claim 15, further comprising:

generating the plurality of modifications to the plurality of reference address records;

creating training data based on the plurality of reference address records and the plurality of modifications; and generating the deep learning model using the training data.

17. The computer-implemented method of claim 16, wherein the plurality of modifications to the plurality of reference address records are based on one or more of address equivalence rules, typographical errors, and phonetic similarity rules.

18. The computer-implemented method of claim 15, further comprising:

applying a classification function to the output to obtain a classified output, wherein the output parsed to obtain the plurality of labeled address components is the classified output.

19. The computer-implemented method of claim 15, further comprising:

generating a standardized address based on the matched address record, the standardized address formatted according to a plurality of standardization rules and indicating one or more address component types of the plurality of address component types.

20. The computer-implemented method of claim 15, wherein the deep learning model further comprises:

a softmax layer coupled to outputs of the fully connected layer and perform a softmax function; and a prediction layer coupled to outputs of the softmax layer to obtain address component types corresponding to the character embedded address.

* * * * *